United States Patent [19]

Huggins

[11] Patent Number: 5,491,181

[45] Date of Patent: Feb. 13, 1996

[54] THEMOPLASTIC MOLDING COMPOUNDS

[75] Inventor: John Huggins, Leverkusen, Germany

[73] Assignee: Bayer Aktiengesellschaft, Leverkusen, Germany

[21] Appl. No.: 279,323

[22] Filed: Jul. 22, 1994

[30] Foreign Application Priority Data

Jul. 29, 1993 [DE] Germany .................. 43 25 483.7

[51] Int. Cl.⁶ .................................................. C08K 9/00
[52] U.S. Cl. ................ 523/200; 523/205; 523/209; 523/216; 524/133; 524/140; 524/148; 524/430; 524/588
[58] Field of Search ............................... 523/200, 205, 523/209, 216; 524/133, 140, 148, 430, 588

[56] References Cited

U.S. PATENT DOCUMENTS

| 4,836,966 | 6/1989 | Shimuzu et al. ................ 524/430 |
|---|---|---|
| 4,954,177 | 9/1990 | Schofield ........................ 524/400 |
| 5,001,091 | 3/1991 | Pujari et al. .................... 501/103 |
| 5,102,592 | 4/1992 | McCauley et al. ................ 264/56 |
| 5,145,900 | 9/1992 | Sterzel et al. .................. 524/430 |
| 5,155,158 | 10/1992 | Kim ............................ 524/430 |
| 5,281,650 | 1/1994 | Burk et al. ..................... 524/430 |
| 5,324,770 | 6/1994 | Cosper ......................... 524/430 |
| 5,348,760 | 9/1994 | Parker et al. .................. 524/430 |

FOREIGN PATENT DOCUMENTS

| 0240160 | 7/1987 | European Pat. Off. . |
| WO92/22509 | 12/1992 | WIPO ............... 524/430 |

Primary Examiner—Mark D. Sweet
Attorney, Agent, or Firm—Sprung Horn Kramer & Woods

[57] ABSTRACT

Thermoplastic molding compounds containing at least one coated ceramic powder and at least one thermoplastic binder, to a process for preparing coated ceramic powders and to a process for producing molded components from ceramic powders. The ceramic powder is coated with at least one ionic, non-ionic or zwitterionic dispersant based on an organic or organometallic compound.

9 Claims, No Drawings

THERMOPLASTIC MOLDING COMPOUNDS

The present invention relates to new thermoplastic molding compounds containing at least one coated ceramic powder and at least one thermoplastic binder, to a process for preparing coated ceramic powders and to a process for producing molded components from ceramic powders.

Thermoplastic moulding compounds are used, amongst others, in processes such as injection molding, extrusion or hot pressing in which temperature-dependent flow behavior is required.

It is known that sinterable ceramic powders can be mixed with thermoplastic binders to form molding compounds and processed to form molded components by processes such as injection molding, extrusion or hot pressing (M. J. Edirisinghe, J. R. G. Evans: Inter. J. High Technology Ceramics 2 (1986) 1–31; R. M. German "Powder Injection Molding" Princeton, N.J.: Metal Powder Industries Federation, 1990).

After the moulding process, the binder is removed from the moulded component. The removal of the binder can take place thermally either at temperatures of between 200° and 1000° C. in air or in an inert atmosphere or a vacuum. The binder can also be partially or completely removed by extraction with solvents or super-critical gases. The binder can also be decomposed and removed by the action of gaseous catalysts.

Then the molded component, which has been partially or completely freed of the binder, is generally sintered at temperatures exceeding 800° C., during which partial or complete phase transition can occur and compression of the body takes place.

To permit the defect-free sintering of the molded components, the molding compounds must have as high as possible a content of ceramic powder of preferably 60 to 70 vol. %. However, it is generally known that with an increasing powder content, the viscosity of the molding compounds also increases at the processing temperature. The increase in viscosity is particularly marked in the case of fine powders.

The injection molding of molding compounds with high processing viscosities has several disadvantages. Complicated or thin-walled molds, as well as molds with long flow paths, can be filled only with difficulty by molding compounds of high viscosity. Molding compounds of high viscosity require a high injection pressure and after-pressure during the injection molding. Molded components with inhomogeneous densities and with high internal tensions are thereby produced which have defects after sintering. Molding compounds of high viscosity lead to more wear of machine parts and thus to impurities in the molded component and higher servicing costs. Molding compounds of high viscosity can only be replastified to a limited extent, since during the injection molding the flow properties of the molding compounds may be irreversibly changed by shear heating. The replastification of the molding compound is desirable in order to be able to utilize sprue parts and damaged moulded components. Consequently the desire exists in the art for thermoplastic molding compounds with a high powder content and low processing viscosity.

In accordance with the prior art, the processing viscosity of highly filled molding compounds is influenced mainly by the selection of the thermoplastic binder. Therefore low-molecular-weight waxes are often recommended (M. A. Strivens, Am. Ceram. Soc. Bull. 42 (1) (1963) 13–19). The viscosity of the molding compounds is also reduced by additives such as sodium stearate or stearic acid and by plasticizers (C. L. Quackenbush, K. French, J. T. Niel, Ceramic Eng. Sci. Proc. 3 (1982) 20–34). The particle size distribution, particle shape and the density of the powder also have an influence on the viscosity of the molding compounds (J. A. Mangels and R. M. Williams, Am. Ceram. Soc. Bull. 62 (5), (1983) 601–606).

The object of the present invention is to produce a new thermoplastic molding compound which is particularly suitable for the production of molded components from ceramic powders.

It has now been found that ceramic powders coated with organic or organometallic dispersants form thermoplastic molding compounds with a particularly low processing viscosity. These molding compounds have good processing properties despite their high contents of ceramic powders. Surprisingly, the viscosities of the molding compounds according to the invention are not only considerably lower than the viscosities of comparable molding compounds composed of uncoated powders, but are also considerably lower than the viscosities of molding compounds composed of uncoated powders to which the dispersants according to the invention were subsequently added.

The present invention relates to a thermoplastic molding compound containing at least one coated ceramic powder and at least one thermoplastic binder. In addition the molding compound according to the invention can contain other auxiliaries such as sintering aids, flow auxiliaries and form release agents.

In another embodiment of the present invention the thermoplastic molding compounds preferably also contain silicone resins in addition to the coated ceramic powder and the thermoplastic binder.

The molding compound according to the invention can also additionally contain non-coated powder provided this does not result in any substantial impairment of the processing properties.

Ionic, non-ionic and/or zwitterionic dispersants can be used according to the invention. All organic and organometallic dispersants containing at least one hydrophilic and at least one hydrophobic group are suitable. In the molding compound according to the invention the dispersant is preferably an organic polymer with a large number of hydrophilic groups. Examples are polyacrylates, polyethylene-vinyl alcohol copolymers, partially saponified polyethylene-acrylic acid copolymers and cellulose derivatives and alkali metal salts thereof. The dispersants according to the invention can be both of the molecular and the polymeric types.

The thermoplastic molding compound according to the invention preferably contains at least one $C_4$- to $C_{40}$-aliphatic radical as the dispersant. Dispersants containing predominantly linear aliphatic radicals are particularly preferred. The preferred aliphatic radicals can also contain heteroatoms, e.g. ether, keto or hydroxy groups, as well as multiple carbon-carbon bonds. Examples are 2-ethylhexyl, decyl, dodecyl, oleyl and octadecyl groups.

The hydrophobic organic groups are bound via chemical bonds to hydrophilic groups or polymers. Preferred hydrophilic groups are carboxylic acids and salts thereof, sulphonic acids and salts thereof, sulphates and salts thereof, phosphonic acid esters and salts thereof, amines, amine oxides and ammonium salts, as well as polyalcohols or amino alcohols such as sorbitol, glycerol, ethanolamine and the like, and hydrophilic polymers such as polyether, polyvinyl alcohol, and the like.

The dispersants can also contain hydrophobic organofluorine radicals.

The dispersants can also contain hydrophobic organosilicon radicals and polysiloxanes.

Examples of non-ionic dispersants are polyethylene oxide derivatives of alkyl phenols, aliphatic alcohols and aliphatic carboxylic acids as well as polyethylene oxide derivatives of fatty acid esters with polyalcohols such as glycerol, sorbitol and the like, fatty acid derivatives of alcohol amines such as diethanolamine and the like, and polyether-polysiloxane copolymers.

In a preferred embodiment of the present invention the ionic dispersant is a salt of an anionic dispersant and a monovalent cation.

Examples of ionic and ionizable dispersants are carboxylic acids and salts thereof, such as stearic acid, sodium stearate and sodium-N-lauroyl sarcosides, partially saponified acylated polypeptides, alkyl- and alkylbenzene sulphonic acids and salts thereof, such as dodecylbenzene sulphonic acid salts, N-acyl- or N-methyltaurine salts and sulphosuccinate ester salts, sulphonated alcohols, polyethylene oxide derivatives of long-chain alcohols and salts thereof such as sodium lauryl sulphates and the like, phosphoric acid- and polyphosphoric acid partial esters and salts thereof, such as phosphoric acid di-octyl esters, phosphonobutane tricarboxylic acid and its carboxylic acid esters and the like, salts of phosphonocarboxylic acid and phosphonocarboxylic acid esters, salts of phosphonic acid, perfluoroalkyl carboxylic acids and salts thereof and long-chain amines, diamines, polyamines and amino oxides. Preferred ionic dispersants are alkali metal salts of sulphonated alcohols and of phosphoric acid mono- and di-esters.

In a preferred embodiment of the present invention the ionic dispersant is at least one salt of the phosphoric acid ester of the formula $$(A^+)_a(^-O)_b(-HO)_c P(OR)_{3-(b+c)},$$

wherein a and b are each between 0.5 and 1.5 b+c is between 1.0 and 2.0, $A^+$ is a monovalent cation, such as a sodium, potassium or ammonium ion and R is a straight-chain or branched alkyl radical with 4 to 22 C-atoms.

Examples of salts of phosphoric acid esters according to the invention are $$Na^+ \quad (^-O)(HO)P(OC_8H_{17})$$

and $$Na^+ \quad (^-O)P(OC_8H_{17})_2$$

and mixtures thereof. Salts of phosphoric acid monoesters are particularly preferred.

In a further preferred embodiment the ionic dispersant is a salt of the phosphonocarboxylic acid ester of the formula $$(A^+)_a(^-O)_b(R^2O)_c P - \underset{\underset{CH_2-CO-OR^3}{|}}{\overset{\overset{R^1}{|}}{C}} - CO - OR^3,$$

in which a and b are each between 0.5 and 1.5, c is 2–b, $A^+$ is a monovalent cation, such as for example a sodium, potassium or ammonium ion, $R^1$ is hydrogen or a straight-chain or branched, optionally substituted alkyl radical with 1 to 26 C-atoms and $R^2$ and $R^3$ independently of one another are hydrogen or a straight-chain or branched alkyl radical with 1 to 22 C-atoms.

Examples of the salts of the phosphonocarboxylic acid esters according to the invention are $$Na^+ \quad (^-O)(HO)P - \underset{\underset{CH_2-CO-OC_8H_{17}}{|}}{\overset{\overset{O}{\|}}{C}H} - CO - OC_8H_{17}$$

and $$Na^+ \quad (^-O)(HO)P - \underset{\underset{CH_2-CO-OC_8H_{17}}{|}}{\overset{\overset{O}{\|}}{C}} \overset{CH_2-CO-OC_8H_{17}}{-CO-OC_8H_{17}}$$

In a further embodiment of the present invention the ionic dispersant is preferably a salt of the phosphonic acid of the formula $$(A^+)_a(^-O)_b(R^5O)_c P - R^4,$$

in which a and b are each between 0.5 and 1.5, c is 2–b, $A^+$ is a monovalent cation, such as for example a sodium, potassium or ammonium ion or the like, $R^4$ is a straight-chain or branched alkyl radical with 4 to 22 C-atoms and $R^5$ is hydrogen or a straight-chain or branched alkyl radical with 1 to 22 C-atoms.

Examples of salts of the phosphonocarboxylic acid esters according to the invention are $$Na^+ \quad (^-O)(HO)P - C_{10}H_{21}$$

and $$K^+ \quad (^-O)(HO)P - C_{12}H_{25}$$

Examples of cationic dispersants are salts of long-chain amines, diamines and polyamines, quaternary ammonium salts such as N-alkyltrimethylammonium and N-benzyl-N-alkyldimethylammonium salts, quaternary ammonium derivatives of polyethylene oxide alkylamines and quaternary ammonium salts of carboxylic acids, alkyl- and alkylbenzenesulphonic acids, sulphonated alcohols, phosphoric acid- and polyphosphoric acid esters and the like.

Examples of zwitterionic dispersants are aliphatic derivatives of amino acids and aminosulphates such as N-alkylaminopropanoic acid, N-alkyl-β-iminodipropanoic acid, imidazolinecarboxylic acid, N-alkylbetaines, N-alkylsulphobetaines and the like.

Suitable dispersants are obtainable under the trade names BRIJ, SPAN, MYRJ and TWEEN from ICI Specialty Chemicals, TRITON and TERGITOL from Union Carbide Chemicals, ACLYN polymers from Allied Chemicals, MARLOPHOR from Hüls AG and TEGO from Goldschmidt AG.

Ceramic powders according to the invention are all powders, such as oxide ceramics or non-oxidic ceramics or the raw materials for the production thereof, including mineral raw materials for the production of ceramics, which can be sintered to form a solid body.

Examples of preferred oxide ceramics are $Al_2O_3$, $MgO$, $ZrO_2$, $Al_2TiO_5$ and silicate ceramics such as porcelain- and stoneware mixtures which can contain, amongst others, clay, feldspar and quartz. Examples of non-oxidic ceramics are $SiC$ and $Si_3N_4$. The powders can be used alone or as mixtures of different powders.

If the ceramic powder coated according to the invention is a clay-containing powder, this is preferably a powder coated with the salts of anionic dispersants and monovalent cations. A molding compound comprising at least one clay-containing powder coated with the alkali metal salt of phosphoric acid esters, phosphonocarboxylic acid esters or phosphonic acids is particularly preferred.

In general, depending on the type of ceramics used, various sintering aids are added which accelerate phase transition or compression during the sintering of the molded components by the formation of low-melting phases.

The thermoplastic binders according to the invention consist of organically based thermoplastic polymers and waxes as well as auxiliaries. Binders which have a softening temperature in the mixture of between 40° and 200° C., particularly preferably between 50° and 150° C., are preferred. Examples of preferred thermoplastic polymers are polyethylenes, polypropylene, polystyrene, polyacrylates, polyesters and ethylene-vinyl acetate copolymers. Waxes from mineral or natural sources, such as paraffin waxes, montan wax, beeswax or vegetable waxes and their secondary products are also preferred.

Synthetic waxes of a non-polymeric type, such as stearic acid amide, ethylenediamine bis-stearate and stearic acid ethyl ester are likewise preferred.

The auxiliaries according to the invention are substances which improve the processing properties, such as plasticizers and form release agents. Form release agents can ensure, for example, clean and easy demolding. Examples are aliphatic fatty acids and salts thereof, such as stearic acid, sodium stearate, magnesium stearate or the like, as well as oils such as paraffin oil, polydimethyl siloxanes, polymethylphenyl siloxanes, polyethylene oxide, polypropylene oxide and polyether-polysiloxane copolymers. Examples of plasticizers are aliphatic esters of phthalic acid, adipinic acid or phosphoric acid.

The thermoplastic binders according to the invention can also contain additional quantities of dispersants.

The silicone resins according to the invention are preferably polyorganosiloxanes which have a multiply branched structure. Thermoplastic silicone resins and silicone resin mixtures with a softening temperature of between 30° and 200° C. in particular between 40° and 130° C., are preferred. Thermoplastic silicone resins which have a ceramic yield (defined as the residue following pyrolysis up to 1000° C. in air) of at least 60% by weight are particularly preferred. Silicone resins and silicone resin mixtures with the average formula

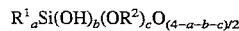

$$R^1{}_a Si(OH)_b(OR^2)_c O_{(4-a-b-c)/2}$$

in which the sum of (a+b+c) is between 1.05 and 1.5, a is between 1.0 and 1.25

$R^1$ is one or more of the radicals H, $C_1$- to $C_{18}$-alkyl, vinyl or phenyl and $R^2$ is one or more of the organic radicals $C_1$- to $C_{18}$-alkyl, are most preferred.

Silicone resins of the above formula, in which $R^1$ comprises at least 80% methyl groups in addition to phenyl groups, are particularly preferred. Silicone resins which are liquid or do not have a softening point are less preferred.

One of the advantages of the molding compounds according to the invention is that they can be processed without solvents. Thus the molding compounds according to the invention do not contain any solvents.

The present invention also relates to a process for preparing coated ceramic powders which are suitable for use as a component of the thermoplastic molding compounds according to the invention, in which a suspension of the ceramic powder in a polar liquid is mixed with at least one ionic, non-ionic or zwitterionic dispersant based on organic or organometallic compounds and the mixture is then dried. Suitable polar liquids are for example water and polar organic liquids such as methanol, ethanol, acetone and the like, as well as mixtures of polar and non-polar organic liquids. Super-critical gases such as $CO_2$ and the like are also polar liquids. Water is preferred as a polar liquid.

The polar liquid is preferably then removed and evaporated, for example by spray drying. The suspension of the coated powder can however also be directly used for the production of the thermoplastic molding compounds, in which case the polar liquid is evaporated after being mixed with the binder.

For the production of the powders coated according to the invention in an aqueous suspension, liquefiers can additionally be added. Liquefiers are auxiliaries which reduce the viscosity of an aqueous suspension of ceramic powders. Many of the dispersants according to the invention are also liquefiers for aqueous suspensions. Other dispersants according to the invention increase the viscosity in the aqueous medium. Many known liquefiers, such as sodium silicate, polyphosphates and the like do not have a viscosity-reducing effect in thermoplastic molding compounds.

In one embodiment of the process according to the invention for the production of coated ceramic powders the aqueous suspension of the ceramic powder is preferably mixed with an aqueous solution or emulsion of the dispersant and the mixture is then dried. The use of solutions in water-miscible organic liquids, such as acetone or ethanol, is also preferred. Depending upon the structure, small quantities of emulsifiers are also necessary to produce emulsions of the water-insoluble dispersants according to the invention. Preferred emulsifiers are water-soluble dispersants usable according to the invention. Emulsions of water-insoluble dispersants which can be used according to the invention, mixed with emulsifiers containing polyethers, are particularly preferred. Emulsifiers containing polyethers with HLB (hydrophilic-lypophilic balance) values of higher than 10 are most preferred.

Dispersants with a melting point of above 20° C. are preferably dissolved in water or processed to form an emulsion at elevated temperatures, and are also mixed with the aqueous suspension of the powder at elevated temperatures.

In a further embodiment of the process according to the invention for the production of coated ceramic powders which are suitable for use as a component of the thermoplastic molding compounds according to the invention, the dispersant is added during the grinding of the ceramic powder. The powder can be ground in the dry or wet state.

The thermoplastic molding compounds according to the invention preferably contain, in addition to the coated ceramic powder, at least such a quantity of binder, silicone resin and auxiliaries as is necessary to obtain a thermoplastically processable compound. Generally the binder together with the silicone resin and auxiliaries must at least fill the free volume between the powder particles in the molding component. Depending upon the powder density and its particle shape and particle size distribution, different quantities are required for this purpose. Experience has shown that 30 to 50 vol. % binder, silicone resin and auxiliaries are required. Molding compounds comprising at least 60 vol. % ceramic powder are particularly preferred.

The thermoplastic molding compounds according to the invention are produced by mixing the abovementioned components at a temperature above the softening temperature of the binder; any residual solvent from the production of the silicone resin is removed. It is advantageous to apply high shear forces during the mixing in order to reduce the powder aggregates and thereby obtain a homogeneous mixture. Suitable mixing machines are for example kneaders, extruders or roll mills.

The molding compounds can then either be used directly or first processed to form powders or granulates.

The thermoplastic molding compounds according to the invention have excellent properties for thermoplastic moulding, such as for example by injection molding extrusion or hot pressing. Moulding compounds which contain the powders coated according to the invention are of lower viscosity at the processing temperature than molding compounds which contain uncoated powders. The Lower viscosity of the molding compounds according to the invention leads to improved processing properties, such as lower injection pressure and less wear. Also the molding compounds according to the invention can contain more ceramic powder for the same viscosity.

The present invention also relates to a process for producing ceramic molding by mixing at least one ceramic powder with thermoplastic binders and (thermo)plastically molding the resulting compound, the ceramic powder being treated with dispersing substances before being mixed with the thermoplastic binder.

The molding components produced with the molding compounds according to the invention are of high quality and can be sintered with a high degree of reliability to form defect-free, compact bodies.

The invention is further described by way of the following examples.

EXAMPLES

The following substances were used in the examples

Porcelain Powder

A raw material mixture for the production of hard porcelain, consisting of approximately 50% kaolin and approximately 50% feldspar and quartz, with an average particle size of 4 to 5 microns, a density of 2.62 g/cm$^3$ and an ignition loss of 7.0% by weight. The powder contains 0.35% by weight sodium silicate as liquefier.

Montan Wax

Produced by the company Hoechst AG under the name Hoechst-Wax-E, with a dropping point of 79° to 85° C., an acid value of 15 to 20 mg KOH/g, a saponification value of 130 to 160 mg KOH/g, a density of 1.01 g/cm$^3$ and a viscosity at 100° C. of approximately 30 mPa.s.

Polyethylene Wax AC8 and AC1702

Two polyethylene waxes produced by the company Allied Corporation under the name A-C Additive 8, with a dropping point of 116° C., a density of 0.93 g/cm$^3$ and a viscosity at 140° C. of approximately 400 mPas, and under the name A-C Additive 1702, with a dropping point of 92° C., a density of 0.88 g/cm$^3$ and a viscosity at 140° C. of approximately 40 mPas.

Copolymer Wax

An ethylene-vinyl acetate copolymer produced by the company Allied Corporation under the name A-C Additive 400, with a dropping point of 95° C., a density of 0.92 g/cm$^3$ and a viscosity at 140° C. of approximately 600 mPas.

EVA-Copolymer

A high-molecular weight ethylene-vinyl acetate copolymer produced by the company BP Chemicals under the name NOVEX V10 H430, with a density of 0.928 g/cm$^3$ and a melt index of 2.0 (ISO 1133, Requirement 4).

Stearic Acid Amide

Obtained from the company Unichem under the name Uniwax amid 1750, with a density of 0.95 g/cm$^3$ and a melting point of 98° to 104° C.

Silicone Resin Solution

A 50% solution in xylene of a silicone resin, containing methyl-, dimethyl- and trimethylsiloxy groups with an average of 1.15 methyl groups per silicon atom, a softening temperature of 55° to 65° C., a density of 1.18 g/cm$^3$ and a ceramic yield after pyrolysis up to 1000° C. in air of 76% by weight.

TWEEN 65

A polyethylene oxide (20) sorbitan-tristearate from the company ICI Specialty Chemicals with an HLB value of 10.5.

ACLYN 285 A

A partly saponified polyethylene acrylic acid copolymer with 1.7 mmol Na/g.

EXAMPLE 1

1000 g porcelain powder was gradually added to 500 g deionized water to produce a viscous suspension. The suspension was stirred for 30 minutes. Then, with constant stirring, 2.5 g phosphoric acid dioctyl ester (DOP), dissolved in 25 ml acetone, was added dropwise over 15 minutes. The suspension was spread out on a metal plate and dried in air for 10 h at 50° C. and for 3 h at 110° C.

EXAMPLE 2

A suspension of 1000 g porcelain powder in 500 g water was produced as in Example 1. Then the suspension was heated to 80° C. and, with constant stirring, 2.5 g TWEEN 65, dissolved in 25 ml warm water, was added dropwise over a period of 15 minutes. The mixture was then stirred for 30 minutes at 80° C. The suspension was spread out on a flat metal plate and dried in air for 10 h at 50° C. and for 3 h at 110° C.

EXAMPLE 3

Porcelain powder was mixed as in Example 2 at 80° C. with 0.25% by weight ACLYN 285 A, dissolved in 25 ml warm water, and dried.

EXAMPLE 4

In a Z-kneader at a temperature of 120° C., 13 g montan wax, 13 g polyethylene wax AC8, 6.5 9 stearic acid amide and 65 g of a 50% silicone resin solution in xylene were mixed for 15 minutes. Then $N_2$ was passed through for 15 minutes and a vacuum was applied for 10 minutes in order to remove the xylene. The mixture was then kneaded for 10 minutes with 281 g porcelain powder with 0.25% by weight phosphoric acid dioctyl ester from Example 1. Then the compound was homogenized for 10 minutes at 130° C. in a two-roller mill.

The molding compound was optically homogeneous, light grey and had a DSC softening temperature of 60° to 110° C. The molding compound contained approximately 63.5 vol. % of porcelain powder. The viscosity of the molding compound (Göttfert capillary rheometer) at 130° C. was 840 Pa.s at a shearing speed of 100/s.

EXAMPLE 5

A molding compound was produced as in Example 4 from 13 g montan wax, 13 g polyethylene wax AC8, 6.5 g stearic acid amide, 65 g 50% silicone resin solution and 282 g porcelain powder with 0.25 % by weight TWEEN 65 from Example 2.

The molding compound had a viscosity at 130° C. of 720 Pa.s at a shearing speed of 100/s.

EXAMPLE 6

A molding compound was produced as in Example 4 from 13 g montan wax, 13 g polyethylene wax AC8, 6.5 g stearic acid amide, 65 g 50% silicone resin solution and 282 g porcelain powder with 0.25 % by weight ACLYN 285 from Example 3.

The molding compound had a viscosity at 130° C. of 730 Pa.s at a shearing speed of 100/s.

COMPARISON EXAMPLES 7 To 10

EXAMPLE 7

A molding compound was produced as in Example 4 from 13 g montan wax, 13 g polyethylene wax AC8, 6.5 g stearic acid amide and 65 g silicone resin solution, but with 282 g uncoated porcelain powder. The viscosity of the molding compound was 1240 Pa.s at 130° C. and a shearing speed of 100/s.

EXAMPLES 8–10

Molding compounds were produced as in Example 4 from 13 g montan wax, 13 g polyethylene wax AC8, 3.9 g stearic acid amide, 65 g 50% silicone resin solution and 2.6 g of a dispersant as well as 282 g uncoated porcelain powder. The results are shown in Table 1.

TABLE 1

| | Viscosity of the molding compounds at 130° C. | | |
|---|---|---|---|
| Example | Powder coating | Binder additive | Viscosity$^a$ Pas |
| 4 | 0.25% DOP$^b$ | none | 840 |
| 5 | 0.25% TWEEN 65 | none | 720 |
| 6 | 0.25% ACLYN 285 | none | 730 |
| 7 | none | none | 1240 |
| 8 | none | 4% DOP | 1300 |
| 9 | none | 4% TWEEN 65 | 1030 |
| 10 | none | 4% ACLYN 285 | 1280 |

$^a$at 100/s;
$^b$DOP = phosphoric acid dioctyl ester

EXAMPLE 11

A molding compound was produced as in Example 4 from 10.4 g polyethylene wax AC 1702, 10.4 g copolymer wax, 15.6 g EVA copolymer, 18.25 g stearic acid amide, 10.4 g octadecanol and 335 g porcelain powder with 0.25 % by weight TWEEN 65 from Example 2.

The molding compound has a calculated powder content of vol. %. The viscosity of the molding compound at 130° C. was 1250 Pas at a shearing speed of 100 l/s and 492 Pas at 500 l/s.

EXAMPLE 12

A molding compound was produced as in Example 11 but with 335 g uncoated porcelain powder. The viscosity of the molding compound at 130° C. was 2005 Pas at a shearing speed of 100 l/s and 710 Pas at 500 l/s.

EXAMPLE 13

1000 g of porcelain powder was gradually added to 500 g of deionized water to produce a viscous suspension. The suspension was stirred for 30 minutes. Then 5.0 g of sodium phosphoric acid dioctyl ester (Na-DOP), dissolved in 100 ml of deionized water, was added dropwise with constant stirring over a period of 15 minutes. The mixture was stirred for 30 minutes and then spread out on a metal sheet. Then the powder was dried in air for 10 hours at 50° C. and 3 hours at 110° C.

EXAMPLES 14 TO 19

Molding compounds were produced from 65 g of a binder consisting of stearic acid amide, montan wax, EVA copolymer and 50% by weight of a silicon resin and 2% by weight of octadecanol and 277 g of a porcelain powder coated with a dispersant as described in Example 13. The viscosities of the molding compounds produced from powders coated with various dispersants are shown in Table 2. The viscosity of a molding compound produced from a non-coated powder is also shown as a comparison example.

TABLE 2

| Viscosity of the molding compounds at 130° C. | | |
|---|---|---|
| Example | Powder coating | Viscosity$^a$ Pa · s |
| 14 | none | 6670 |
| 15 | 0.5% TWEEN 65 | 5370 |
| 16 | 0.5% ACLYN 285 | 5570 |
| 17 | 0.5% Na-DOP$^b$ | 3580 |
| 18 | 0.5% Na-TOPBS$^c$ | 3520 |
| 19 | 0.5% Na-IDEPA$^d$ | 2030 |

$^a$at 100 l/s;
$^b$Na-DOP = the sodium salt of phosphoric acid dioctyl ester;
$^c$the sodium salt of phosphonobutane-1,2,4-tricarboxylic acid trioctyl ester;
$^d$the sodium salt of phosphoric acid monoisodecyl ester

EXAMPLES 20 TO 23

Molding compounds were produced from 60 g of a binder consisting of stearic acid amide, paraffin wax, an EVA copolymer and 30% by weight of silicone resin, and 273 g of a porcelain powder coated with a dispersant as in Example 13. The viscosities of the moulding compounds produced from powders coated with various dispersants are shown in Table 3. The viscosity of a molding compound produced from a non-coated powder is also mentioned as a comparison example.

TABLE 3

| | Viscosity of the molding compounds at 130° C. | |
|---|---|---|
| Example | Powder coating | Viscosity[a] Pa · s |
| 20 | none | 13060 |
| 21 | 0.5% K-IDEPA[b] | 6150 |
| 22 | 0.5% Na-MOPA[c] | 5208 |
| 23 | 0.5% K-IDEPA/DOP[d] | 6530 |

[a] at 100 1/s;
[b] the potassium salt of phosphoric acid monoisodecyl ester
[c] the sodium salt of phosphoric acid monooctyl ester;
[d] 1:1 mixture It is understood that the specification and examples are illustrative but not limitative of the present invention and that other embodiment within the spirit and scope of the invention will suggest themseves to those skilled in the art.

I claim:

1. In a themoplastic molding compound containing at least one coated ceramic powder and at least one thermoplastic binder, the improvement wherein the ceramic powder is coated with at least one dispersant comprising a monovalent cation salt of an acid selected from the group consisting of a phosphoric acid ester, a phosphonocarboxylic acid ester and a phosphonic acid.

2. A thermoplastic molding compound according to claim 1, additionally containing at least one silicone resin.

3. A thermoplastic molding compound according to claim 1, wherein the dispersant contains at least one $C_4$- to $C_{40}$-aliphatic radical.

4. A thermoplastic molding compound according to claim 1, wherein the dispersant is at least one salt of a phosphoric acid ester of the formula $$(A^+)_a(^-O)_b(HO)_cP(OR)_{3-(b+c)}$$
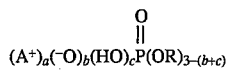

in which a and b are each between 0.5 and 1.5, b+c is between 1.0 and 2.0, $A^+$ is a monovalent cation and R is a straight-chain or branched alkyl radical with 4 to 22 C-atoms.

5. A thermoplastic molding compound according to claim 1, wherein the dispersant is a salt of a phosphonocarboxylic acid ester of the formula
in which a and b each is between 0.5 and 1.5, c is 2–b, $A^-$ is a monovalent cation, $R^1$ is hydrogen or a straight-chain or branched, optionally substituted alkyl radical with 1 to 26 C-atoms, and $R^2$ and $R^3$ independently of one another are hydrogen or a straight-chain or branched alkyl radical with 1 to 22 C-atoms.

6. A thermoplastic molding compound according to claim 1, wherein the dispersant is a salt of a phosphonic acid of the formula $$(A^+)_a(^-O)_b(R^5O)_cP-R^4$$
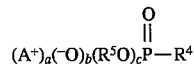

in which a and b are each between 0.5 and 1.5, c is 2–b, $A^+$ is a monovalent cation, $R^4$ is a straight-chain or branched alkyl radical with 4 to 22 C-atoms, and $R^5$ is hydrogen or a straight-chain or branched alkyl radical with 1 to 22 C-atoms.

7. A process for preparing a coated ceramic powder according to claim 1, suitable for use as a component of a thermoplastic molding compound, which comprises mixing a suspension in a polar liquid of at least one dispersant and at least in part comprising uncalcined clay, drying the coated ceramic powder, and mixing the ceramic powder with a thermoplastic binder above the softening temperature of the binder, the dispersant comprising a monovalent cation salt of an acid selected from the group consisting of a phosphoric acid ester, a phosphonocarboxylic acid ester and salt of a phosphonic acid.

8. A process according to claim 7, wherein an aqueous suspension of the ceramic powder is mixed with an aqueous solution or emulsion of the dispersant, and the mixture is then dried.

9. In the production of a ceramic molded component by mixing at least one ceramic powder with a thermoplastic binder, (thermo)plastically molding the resulting compound and sintering, the improvement which comprises, before mixing the ceramic powder with the thermoplastic binder, treating the ceramic powder with at least one dispersant comprising a monovalent cation salt of an acid selected from the group consisting of a phosphoric acid ester, a phosphonocarboxylic acid ester, and a phosphonic acid.

* * * * *

UNITED STATES PATENT AND TRADEMARK OFFICE
CERTIFICATE OF CORRECTION

PATENT NO. : 5,491,181
DATED : February 13, 1996
INVENTOR(S) : Huggins, John

It is certified that error appears in the above-indentified patent and that said Letters Patent is hereby corrected as shown below:

Title Page & Col. 1 line 1    Title [54]: Delete "THEMOPLASTIC " and substitute -- THERMOPLASTIC --

Col. 11, claim 1 line 1    Delete " themoplastic " and substitute -- thermoplastic --

Signed and Sealed this

Twenty-seventh Day of August, 1996

Attest:

BRUCE LEHMAN

Attesting Officer    Commissioner of Patents and Trademarks